US009766700B2

(12) United States Patent
Lyons et al.

(10) Patent No.: US 9,766,700 B2
(45) Date of Patent: Sep. 19, 2017

(54) GAZE ACTIVATED CONTENT TRANSFER SYSTEM

(75) Inventors: Kenton M. Lyons, Santa Clara, CA (US); Trevor Pering, San Francisco, CA (US)

(73) Assignee: INTEL CORPORATION, Santa Clara, CA (US)

( * ) Notice: Subject to any disclaimer, the term of this patent is extended or adjusted under 35 U.S.C. 154(b) by 66 days.

(21) Appl. No.: 13/976,459

(22) PCT Filed: Dec. 14, 2011

(86) PCT No.: PCT/US2011/064806
§ 371 (c)(1),
(2), (4) Date: Jun. 24, 2014

(87) PCT Pub. No.: WO2013/089693
PCT Pub. Date: Jun. 20, 2013

(65) Prior Publication Data
US 2016/0034029 A1 Feb. 4, 2016

(51) Int. Cl.
G06F 3/00 (2006.01)
G06F 3/048 (2013.01)
G06F 3/01 (2006.01)
G06F 3/0482 (2013.01)
G06F 3/0484 (2013.01)
H04L 29/08 (2006.01)
G06F 3/14 (2006.01)

(52) U.S. Cl.
CPC ............ *G06F 3/013* (2013.01); *G06F 3/0482* (2013.01); *G06F 3/0484* (2013.01); *H04L 67/06* (2013.01)

(58) Field of Classification Search
None
See application file for complete search history.

(56) References Cited

U.S. PATENT DOCUMENTS 4,595,990 A * 6/1986 Garwin ................. A61B 3/113
708/141
4,836,670 A * 6/1989 Hutchinson ............ A61B 3/113
351/210
(Continued)

OTHER PUBLICATIONS

Mark Ashdown, Kenji Oka, Yoichi Sato, Combining Head Tracking and Mouse Input for a GUI on Multiple Monitors , 2005, 4 pages.*
(Continued)

*Primary Examiner* — Yongjia Pan

(57) ABSTRACT

A gaze activated data unit transfer system is described. An apparatus may comprise a gaze interface application operative on a processor circuit to manage data unit transfer operations based on eye movements of a human user. The gaze interface application may comprise a gaze interpreter component operative to receive eye movement information of a human eye from one or more eye gaze trackers, and interpret the eye movement information as a data unit transfer request to transfer a data unit from a source device to a target device, a data connection component operative to establish a data connection between the source and target devices using the transceiver in response to the data unit transfer request, and a data transfer component operative to send the data unit from the source device to the target device over the data connection. Other embodiments are described and claimed.

16 Claims, 11 Drawing Sheets

(56) References Cited

U.S. PATENT DOCUMENTS

| | | | | |
|---|---|---|---|---|
| 6,243,076 B1* | 6/2001 | Hatfield | G06F 3/013 | 345/156 |
| 6,373,961 B1* | 4/2002 | Richardson | G06F 3/013 | 345/8 |
| 6,545,669 B1* | 4/2003 | Kinawi | G06F 3/0486 | 345/1.1 |
| 6,637,883 B1* | 10/2003 | Tengshe | A61B 3/113 | 351/210 |
| 6,659,611 B2* | 12/2003 | Amir | G06K 9/00604 | 351/210 |
| 7,050,624 B2* | 5/2006 | Dialameh | G06K 9/00288 | 348/E13.014 |
| 7,542,210 B2* | 6/2009 | Chirieleison, Sr. | G02B 27/0093 | 345/8 |
| 7,561,143 B1 | 7/2009 | Milekic | | |
| 7,881,493 B1 | 2/2011 | Edwards et al. | | |
| 7,963,652 B2* | 6/2011 | Vertegaal | G06K 9/00604 | 351/205 |
| 8,632,182 B2* | 1/2014 | Chen | G02C 7/04 | 351/219 |
| 8,788,977 B2* | 7/2014 | Bezos | G06F 1/1626 | 715/773 |
| 8,793,620 B2* | 7/2014 | Stafford | G06F 3/012 | 345/159 |
| 9,367,224 B2* | 6/2016 | Ananthakrishnan | G06F 3/0486 | |
| 2002/0080179 A1* | 6/2002 | Okabe | G06F 3/0486 | 715/769 |
| 2002/0105482 A1* | 8/2002 | Lemelson | G06F 3/0485 | 345/7 |
| 2004/0193413 A1* | 9/2004 | Wilson | G06F 3/017 | 704/243 |
| 2005/0243054 A1* | 11/2005 | Beymer | A61B 3/0033 | 345/156 |
| 2006/0093998 A1* | 5/2006 | Vertegaal | G06F 3/011 | 434/236 |
| 2006/0146765 A1* | 7/2006 | Van De Sluis | G06F 3/016 | 370/338 |
| 2007/0176898 A1* | 8/2007 | Suh | G06F 1/1616 | 345/158 |
| 2008/0143674 A1* | 6/2008 | Molander | G06F 3/013 | 345/157 |
| 2008/0266257 A1* | 10/2008 | Chiang | G06F 1/1626 | 345/163 |
| 2009/0140986 A1* | 6/2009 | Karkkainen | G06F 3/0486 | 345/173 |
| 2009/0179853 A1* | 7/2009 | Beale | G06F 3/013 | 345/156 |
| 2009/0187842 A1* | 7/2009 | Collins | G06F 3/0486 | 715/769 |
| 2010/0122194 A1* | 5/2010 | Rogers | G06F 3/04817 | 715/769 |
| 2010/0182232 A1* | 7/2010 | Zamoyski | G06F 3/013 | 345/157 |
| 2010/0220290 A1 | 9/2010 | Chen et al. | | |
| 2010/0295774 A1 | 11/2010 | Hennessey | | |
| 2011/0083111 A1* | 4/2011 | Forutanpour | G06F 1/1694 | 715/863 |
| 2011/0163944 A1* | 7/2011 | Bilbrey | G01D 21/02 | 345/156 |
| 2011/0179097 A1* | 7/2011 | Ala-Rantala | G06F 3/0482 | 707/829 |
| 2011/0197147 A1* | 8/2011 | Fai | G06F 1/1639 | 715/753 |
| 2011/0249024 A1* | 10/2011 | Arrasvuori | G06F 3/017 | 345/629 |
| 2011/0283212 A1* | 11/2011 | Warner | G06F 3/0488 | 715/769 |
| 2012/0249429 A1* | 10/2012 | Anderson | G06F 3/011 | 345/173 |
| 2013/0033525 A1* | 2/2013 | Markiewicz | G06F 3/0485 | 345/684 |
| 2013/0321265 A1* | 12/2013 | Bychkov | G06F 3/017 | 345/156 |

OTHER PUBLICATIONS

Ravikrishna Ruddarraju, Antonio Haro, Kris Nagel, Quan T. Tran, Irfan A. Essa, Gregory Abowd, Elizabeth D. Mynatt, Perceptual User Interfaces using Vision-based Eye Tracking, 2003, 7 pages.*

Robert Jacob, What You Look At Is What You Get: Eye Movement-Based Interactions Techniques, 1990, 8 pages.*

Manu Kumar, Andreas Paepcke, Terry Winograd, EyePoint: Practical Pointing and Selection Using Gaze and Keyboard, 2007, 10 pages.*

Brad A. Myers, Choon Hong Peck, Jeffrey Nichols, Dave Kong, Robert Miller, Interacting at a Distance Using Semantic Snarfing, 2001, 11 pages.*

Extended European Search Report received for European Patent Application No. 11877470.2, mailed Jul. 22, 2015, 8 pages.

Rekimoto, et al., "Augmented Surfaces: A Spatially Continuous Work Space for Hybrid Computing Environments", Chi Conference Proceedings, Human Factors in Computing Systems, May 15, 1999, 8 pages.

International Search Report and Written Opinion, Mailed Date: Sep. 27, 2012, Application No. PCT/US2011/064806, filed Date: Dec. 14, 20111, pp. 9.

Office Action received for Chinese Patent Application No. 201180075501.0, mailed Dec. 30, 2015, 10 pages (untranslated).

Poitschke et al., "Gaze-based interaction on multiple displays in an automotive environment", IEEE, 2011, 6 pages.

* cited by examiner

700

RECEIVE EYE MOVEMENT INFORMATION OF A HUMAN EYE FROM ONE OR MORE EYE GAZE TRACKERS
702

INTERPRET THE EYE MOVEMENT INFORMATION AS A DATA UNIT TRANSFER REQUEST TO TRANSFER A DATA UNIT FROM A SOURCE DEVICE TO A TARGET DEVICE
704

ESTABLISH A DATA CONNECTION BETWEEN THE SOURCE AND TARGET DEVICES IN RESPONSE TO THE DATA UNIT TRANSFER REQUEST
706

TRANSFER THE DATA UNIT FROM THE SOURCE DEVICE TO THE TARGET DEVICE OVER THE DATA CONNECTION
708

TERMINATE THE DATA CONNECTION BETWEEN THE SOURCE AND TARGET DEVICES AFTER THE DATA UNIT IS TRANSFERRED
710

- IDENTIFY AN ORIGIN POINT AND A TERMINATION POINT FOR AN EYE GAZE SEGMENT BASED ON THE EYE MOVEMENT INFORMATION
  802

- MAP THE ORIGIN POINT TO A DATA UNIT STORED BY A SOURCE DEVICE
  804

- MAP THE TERMINATION POINT TO A TARGET DEVICE
  806

- INTERPRET THE EYE GAZE SEGMENT AS A DATA UNIT TRANSFER REQUEST TO TRANSFER THE DATA UNIT FROM THE SOURCE DEVICE TO THE TARGET DEVICE
  808

```
GENERATE LIGHT BEAMS TOWARDS EYES OF A HUMAN
USER
902
```

```
RECORD IMAGES OF THE EYES, THE IMAGES INCLUDING A
VIRTUAL IMAGE OF THE LIGHT SOURCE AND AN
ILLUMINATED PUPIL CAUSED BY REFLECTION OF THE
LIGHT BEAMS FROM A CORNEA OF EACH EYE
904
```

```
ANALYZE DIRECTION AND DISTANCE OF MOVEMENT OF
THE EYES BASED ON THE VIRTUAL IMAGES AND THE
ILLUMINATED PUPILS
906
```

```
SEND THE DIRECTION AND DISTANCE OF MOVEMENT OF
THE EYES AS EYE MOVEMENT INFORMATION TO A GAZE
INTERFACE APPLICATION
908
```

*FIG. 9*

GAZE ACTIVATED CONTENT TRANSFER SYSTEM

BACKGROUND

Personal electronic devices are becoming increasingly ubiquitous and integrated into daily user routines. For example, an information worker may begin working on a word processing document on a desktop computer, transfer the document file to a notebook computer to become mobile, and then to a tablet computer or smart phone for travel. A business executive may take a picture on a smart phone, and transfer the image file to a digital frame in her office. A film producer may begin watching a movie on a tablet computer in a car, and transfer the movie file to a workstation at home for editing.

The ability to transfer files between different devices is a major convenience in a time when users have multiple personal electronic devices. Data unit transfer techniques allow a user to create, modify and consume content at the convenience of the user, which in turn enhances user productivity and user experience. However, conventional data unit transfer techniques need some level of manual intervention by a user. For example, a user may need to copy a file from one device to a data storage device, such as a universal serial bus (USB) flash drive or network server, and then copy the file from the data storage device to another device. In another example, a user may transfer a file as an attachment to a message, such as an email message, a short messaging service (SMS) message, or a multimedia messaging service (MMS) message. These file transfer techniques are limiting, cumbersome and time consuming. Some file transfer techniques attempt to limit manual intervention, such as "bump" technology which activates a file transfer when two devices touch, or a gesture interface that activates a file transfer in response to a hand gesture. However, these file transfer techniques still need a significant amount of manual intervention by a user, particularly if the user has a disability. Therefore, one design goal for personal electronic devices is to reduce manual intervention to activate file transfers.

BRIEF DESCRIPTION OF THE DRAWINGS

FIG. 7 illustrates an embodiment of a first logic flow.

FIG. 8 illustrates an embodiment of a second logic flow.

FIG. 9 illustrates an embodiment of a third logic flow.

DETAILED DESCRIPTION

Figure 1:
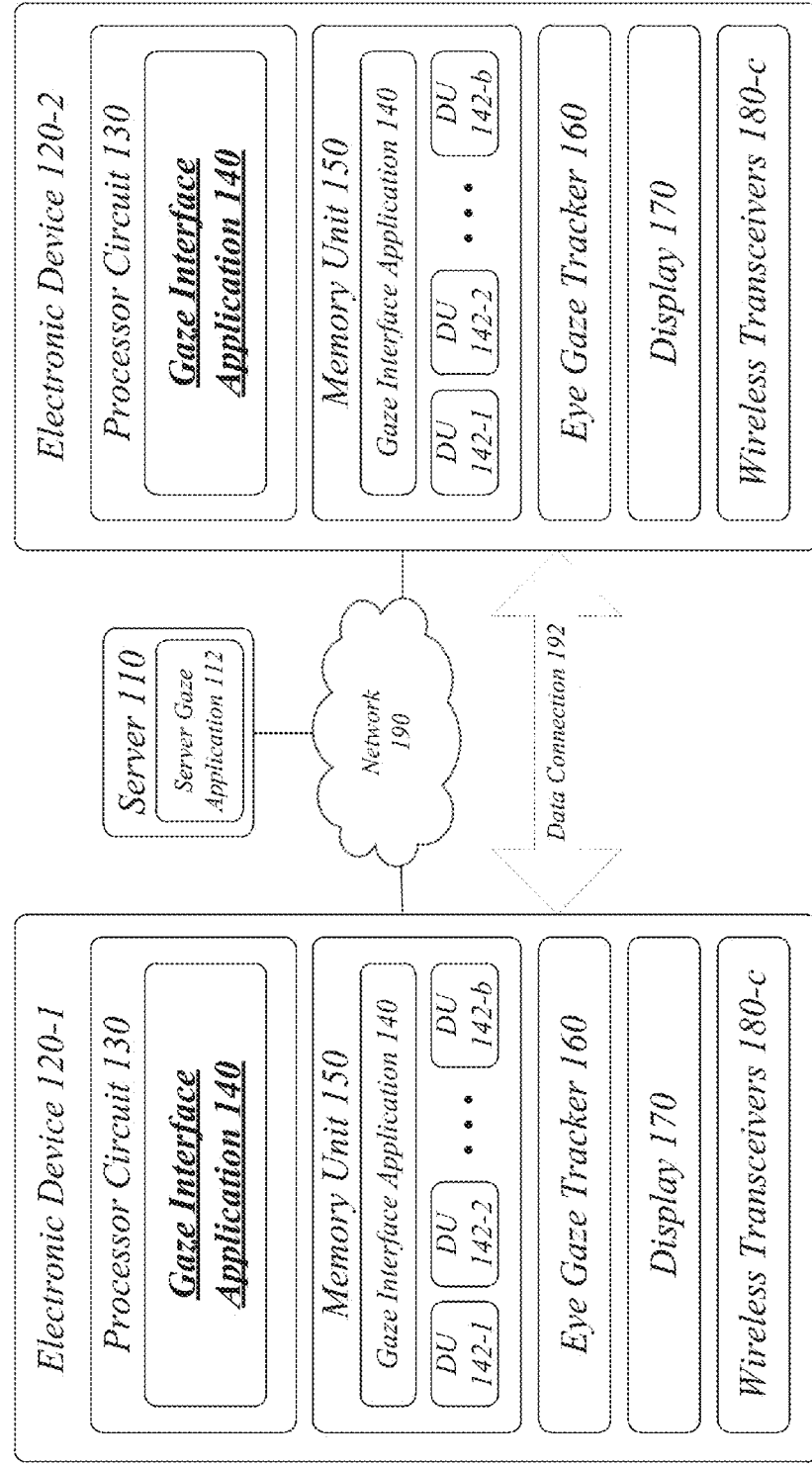
FIG. 1 illustrates an embodiment of a gaze data unit transfer system.

Various embodiments are generally directed to content transfer techniques. Some embodiments are particularly directed to content transfer techniques that are activated by eye movement of a user. A user may transfer content between devices by simply looking at one or both devices. This significantly reduces manual intervention needed by a user to transfer content between multiple personal electronic devices, thereby enhancing user productivity, convenience, and experience.

With general reference to notations and nomenclature used herein, the detailed description which follows may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a gaze content transfer system 100. In one embodiment, the gaze content transfer system 100 may comprise a computer-based system comprising an electronic device 120-*a*. The electronic device 120-*a* may comprise, for example, a processor circuit 130, a memory unit 150, an eye gaze tracker 160, a display 170, and one or more transceivers 180-*c*. The electronic device 120-*a* may further have installed a gaze interface application 140. The memory unit 150 may store an unexecuted version of the gaze interface application 140, and one or more data units 142-*b*. Although the gaze content transfer system 100 shown in FIG. 1 has a limited number of elements in a certain topology, it may be appreciated that the gaze content transfer system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of electronic devices 120-*a* may include electronic devices 120-1, 120-2, 120-3, 120-4 and 120-5. The embodiments are not limited in this context.

In various embodiments, the gaze content transfer system 100 may comprise two or more electronic devices 120-*a*, such as electronic devices 120-1, 120-2. Some examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, machine, or combination thereof. The embodiments are not limited in this context.

In one embodiment, for example, the electronic device 120-1 may be implemented as a desktop computer having wireless communications capabilities. The electronic device 120-2 may be implemented as a mobile device having a portable power supply and wireless communications capabilities, such as a laptop computer, handheld computer, tablet computer, smart phone, gaming device, consumer electronic, or other mobile device. The embodiments are not limited to these examples, however, and any pair of electronic devices 120-1, 120-2 may be used as desired for a given implementation. Further, although the electronic devices 120-1, 120-2 are shown in FIG. 1 as homogeneous devices having similar device elements, it may be appreciated that the electronic devices 120-1, 120-2 may comprise heterogeneous devices having different device elements. The embodiments are not limited in this context.

In various embodiments, the gaze content transfer system 100 may comprise a processor circuit 130. The processing circuit 130 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core (2) Quad®, Core i3®, Core i5®, Core i7®, Atom®, Itanium®, Pentium®, Xeon®, and XScale® processors; and similar processors. Dual microprocessors, multi-core processors, and other multi-processor architectures may also be employed as the processing circuit 130.

In various embodiments, the gaze content transfer system 100 may comprise a memory unit 150. The memory unit 150 may store, among other types of information, the gaze interface application 140 and one or more data units 142-*b*. The memory unit 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

A data unit 142-*b* may comprise any defined set of electronic information, data or content capable of being uniquely identified, presented by a user interface view, or represented by a user interface element of a user interface view. One example of a user interface view may comprise a graphical user interface (GUI) view. One exemplary class of data units 142-*b* may include without limitation software computer files, including application files (e.g., document files, word processing files, spreadsheet files, presentation files, etc.), system files (e.g., operating system files, library files, utility files, etc.), and multimedia content files (e.g., audio files, video files, audio/video files, picture files, image files, etc.). Other examples of data units 142-*b* may include without limitation objects presented by a user interface, user interface elements, GUI elements, multimedia content (e.g., pictures, images, video, audio, graphics, etc.), software programs, views of software programs, application documents, application content (e.g., a paragraph from a word processing document or work sheet from a spreadsheet document), a web page, a web site, a uniform resource locator (URL) from a web browser, clipboard data, screenshots, device resource data (e.g., sensor data), and so forth. These are merely a few examples, and any type of defined set of electronic information, data or content may comprise a data unit 142-*b*. The embodiments are not limited in this context.

It is worth to note that some embodiments may describe data units 142-*b* in terms of files or file transfers by way of example and not limitation. It may be appreciated that the embodiments operating on files and performing file transfers may be applied to other types of data units 142-*b*. The embodiments are not limited in this context.

The electronic devices 120-1, 120-2 may each implement an eye gaze tracker 160. An eye gaze tracker 160 is a device for measuring eye positions and eye movement, a technique that is sometimes referred to as "eye tracking" or "gaze tracking." Eye tracking is a technique to measure either a point of a gaze by a user, or a motion of an eye relative to the head. The eye gaze tracker 160 may utilize any number of techniques for measuring eye movement. One variant uses video images from which an eye position is extracted. Other variants use search coils or are based on an electrooculogram. In one embodiment, for example, the eye gaze tracker 160 may track eye movements of a user utilizing a corneal reflection technique. Examples for an eye gaze tracker 160 are described with reference to FIGS. 6A, 6B.

The eye gaze tracker 160 of one or both electronic devices 120-1, 120-2 may monitor and collect eye movement information. The eye movement information may include, for example, stationary information, direction information, and distance information, among other types of eye movement information. Stationary information may include a fixed point where eyes are fixated for some defined time interval (e.g., 2 seconds). Direction information may include a direction of eye movement. The direction of eye movement may be expressed from a perspective of a user, such as towards a right side of a user head, towards left side of a user head, towards a top of a user head, towards a bottom of a user head, and any directions in-between these four exemplary directions. Distance information may include a distance of eye movement over a defined time interval. The distance of eye movement may be expressed in terms of an origin point, a termination point, and distance between the origin point and the termination point. The origin point and the termination point may be determined using fixed points indicated by the stationary information. The stationary information, direction information and distance information may be used to define an eye gaze segment. The eye movement information may also include other types of information commonly generated by conventional eye gaze trackers.

The electronic devices 120-1, 120-2 may each implement a display 170. The display 170 may comprise any digital display device suitable for the electronic devices 120-1, 120-2. For instance, the display 170 may be implemented by a liquid crystal display (LCD) such as a touch-sensitive, color, thin-film transistor (TFT) LCD, a plasma display, a light emitting diode (LED) display, an organic light emitting diode (OLED) display, a cathode ray tube (CRT) display, or other type of suitable visual interface for displaying content to a user of the electronic devices 120-1, 120-2. The display 170 may further include some form of a backlight or brightness emitter as desired for a given implementation.

The electronic devices 120-1, 120-2 may each implement one or more wireless transceivers 180-c. Each of the wireless transceivers 180-c may be implemented as physical wireless adapters or virtual wireless adapters, sometimes referred to as "hardware radios" and "software radios." In the latter case, a single physical wireless adapter may be virtualized using software into multiple virtual wireless adapters. A physical wireless adapter typically connects to a hardware-based wireless access point. A virtual wireless adapter typically connects to a software-based wireless access point, sometimes referred to as a "SoftAP." For instance, a virtual wireless adapter may allow ad hoc communications between peer devices, such as a smart phone and a desktop computer or notebook computer. Various embodiments may use a single physical wireless adapter implemented as multiple virtual wireless adapters, multiple physical wireless adapters, multiple physical wireless adapters each implemented as multiple virtual wireless adapters, or some combination thereof. The embodiments are not limited in this case.

The wireless transceivers 180-c may comprise or implement various communication techniques to allow the electronic devices 120-1, 120-2 to communicate with other electronic devices via a network 190. For instance, the wireless transceivers 180-c may implement various types of standard communication elements designed to be interoperable with a network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the electronic devices 120-a may implement different types of wireless transceivers 180-c. Each of the wireless transceivers 180-c may implement or utilize a same or different set of communication parameters to communicate information between various electronic devices. In one embodiment, for example, each of the wireless transceivers 180-c may implement or utilize a different set of communication parameters to communicate information between the electronic device 120-a and a remote device. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the wireless transceivers 180-c. The embodiments are not limited in this context.

In various embodiments, the wireless transceivers 180-c may implement different communication parameters offering varying bandwidths, communications speeds, or transmission range. For instance, a first wireless transceiver 180-1 may comprise a short-range interface implementing suitable communication parameters for shorter range communications of information, while a second wireless transceiver 180-2 may comprise a long-range interface implementing suitable communication parameters for longer range communications of information.

In various embodiments, the terms "short-range" and "long-range" may be relative terms referring to associated communications ranges (or distances) for associated wireless transceivers 180-c as compared to each other rather than an objective standard. In one embodiment, for example, the term "short-range" may refer to a communications range or distance for the first wireless transceiver 180-1 that is shorter than a communications range or distance for another wireless transceiver 180-c implemented for the electronic device 120-a, such as a second wireless transceiver 180-2. Similarly, the term "long-range" may refer to a communications range or distance for the second wireless transceiver 180-2 that is longer than a communications range or distance for another wireless transceiver 180-c implemented for the electronic device 120-a, such as the first wireless transceiver 180-1. The embodiments are not limited in this context.

In various embodiments, the terms "short-range" and "long-range" may be relative terms referring to associated communications ranges (or distances) for associated wireless transceivers 180-c as compared to an objective measure, such as provided by a communications standard, protocol or interface. In one embodiment, for example, the term "short-range" may refer to a communications range or distance for the first wireless transceiver 180-1 that is shorter than 300 meters or some other defined distance. Similarly, the term "long-range" may refer to a communications range or distance for the second wireless transceiver 180-2 that is longer than 300 meters or some other defined distance. The embodiments are not limited in this context.

In one embodiment, for example, the wireless transceiver 180-1 may comprise a radio designed to communicate information over a wireless personal area network (WPAN) or a wireless local area network (WLAN). The wireless transceiver 180-1 may be arranged to provide data communications functionality in accordance with different types of lower range wireless network systems or protocols. Examples of suitable WPAN systems offering lower range data communication services may include a Bluetooth system as defined by the Bluetooth Special Interest Group, an infra-red (IR) system, an Institute of Electrical and Electronics Engineers (IEEE) 802.15 system, a DASH7 system, wireless universal serial bus (USB), wireless high-definition (HD), an ultra-side band (UWB) system, and similar systems. Examples of suitable WLAN systems offering lower range data communications services may include the IEEE 802.xx series of protocols, such as the IEEE 802.11a/b/g/n series of standard protocols and variants (also referred to as "WiFi"). It may be appreciated that other wireless techniques may be implemented, and the embodiments are not limited in this context.

In one embodiment, for example, the wireless transceiver 180-2 may comprise a radio designed to communicate information over a wireless local area network (WLAN), a wireless metropolitan area network (WMAN), a wireless wide area network (WWAN), or a cellular radiotelephone system. The wireless transceiver 180-2 may be arranged to provide data communications functionality in accordance with different types of longer range wireless network systems or protocols. Examples of suitable wireless network systems offering longer range data communication services may include the IEEE 802.xx series of protocols, such as the IEEE 802.11a/b/g/n series of standard protocols and variants, the IEEE 802.16 series of standard protocols and variants, the IEEE 802.20 series of standard protocols and variants (also referred to as "Mobile Broadband Wireless Access"), and so forth. Alternatively, the wireless transceiver 180-2 may comprise a radio designed to communication information across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and similar systems. It may be appreciated that other wireless techniques may be implemented, and the embodiments are not limited in this context.

Although not shown, the electronic device 120-a may further comprise one or more device resources commonly implemented for electronic devices, such as various computing and communications platform hardware and software components typically implemented by a personal electronic device. Some examples of device resources may include without limitation a co-processor, a graphics processing unit (GPU), a chipset/platform control hub (PCH), an input/output (I/O) device, computer-readable media, display electronics, display backlight, network interfaces, location devices (e.g., a GPS receiver), sensors (e.g., biometric, thermal, environmental, proximity, accelerometers, barometric, pressure, etc.), portable power supplies (e.g., a battery), application programs, system programs, and so forth. Other examples of device resources are described with reference to exemplary computing architectures shown by FIG. 10. The embodiments, however, are not limited to these examples.

In the illustrated embodiment shown in FIG. 1, the processor circuit 130 may be communicatively coupled to the wireless transceivers 180-c and the memory unit 150. The memory unit 150 may store a gaze interface application 140 arranged for execution by the processor circuit 130 to manage data unit transfers of the data units 142-b between the electronic devices 120-1, 120-2 via the transceivers 180-c.

The gaze interface application 140 may generally provide features to manage data unit transfer operations (e.g., file transfer operations) based on eye movements of a human user. More particularly, the gaze interface application 140 allows a user to transfer a data unit 142-b between the electronic devices 120-1, 120-2 simply by gazing at the electronic devices 120-1, 120-2 in a defined eye movement pattern known to the user and captured by the eye gaze tracker 160. When transferring a data unit 142-b from the electronic device 120-1 to the electronic device 120-2, the electronic device 120-1 may be referred to as a "source device" and the electronic device 120-2 may be referred to as a "target device." When transferring a data unit 142-b from the electronic device 120-2 to the electronic device 120-1, the electronic device 120-2 may be referred to as a "source device" and the electronic device 120-1 may be referred to as a "target device."

The gaze interface application 140 may receive eye movement information from one or both eye gaze trackers 160 implemented by the electronic devices 120-1, 120-2, respectively. When using eye movement information from both eye gaze trackers 160, the electronic devices 120-1, 120-2 may exchange eye movement information between devices through a server gaze application 112 implemented by a server 110 via a network 190.

In one embodiment, the server gaze application 112 may be designed to interoperate with the gaze interface application 140. For instance, the server gaze application 112 may coordinate a transfer of information between the electronic devices 120-1, 120-2, provide software updates for the gaze interface application 140, store data for the gaze interface application 140 (e.g., eye movement patterns), provide additional processing resources for complex image analysis, and so forth.

In one embodiment, the server gaze application 112 may be designed to replace some or all of the functions provided by the gaze interface application 140. For instance, the server gaze application 112 may be implemented as a web application or cloud-computing application accessible by the electronic devices 120-1, 120-2 via a web browser and other web technologies. In this case, the gaze interface application 140 may be implemented as a thin-client application to serve and present data managed by the server gaze application 112, or replaced by a standard web browser. Additionally or alternatively, software operations for the eye gaze tracker 160 may be implemented as part of the server gaze application 112, and hardware operations may be performed using local hardware resources implemented by the electronic devices 120-1, 120-2 (e.g., light sources and video cameras).

The gaze interface application 140 for one of the electronic devices 120-1, 120-2 may aggregate eye movement information from one or both of the eye gaze trackers 160, and extract eye gaze segments from the eye movement information. The gaze interface application 140 may then analyze each eye gaze segment to infer whether an eye gaze segment implies a data unit transfer request for a data unit 142-b, such as a data unit 142-1 stored in the memory unit 150, between the electronic devices 120-1, 120-2.

When the gaze interface application 140 interprets an eye gaze segment as a data unit transfer request for a data unit 142-1, the gaze interface application 140 may automatically initiate data unit transfer operations by establishing a data connection 192 between the electronic devices 120-1, 120-2 using the wireless transceivers 180-c. The gaze interface application 140 may then transfer the data unit 142-1 from the electronic device 120-1 (source device) to the electronic device 120-2 (target device) over the data connection 192. Once the data unit transfer is complete, the gaze interface application 140 may terminate the data connection 192 to release computing and communications resources for the electronic devices 120-1, 120-2. In this manner, a user may transfer data units 142-b between electronic devices 120-1, 120-2 using nothing more than eye movements, thereby substantially reducing manual intervention for data unit transfer operations.

Particular aspects, embodiments and alternatives of the gaze content transfer system 100 and the gaze interface application 140 may be further described with reference to FIG. 2.

Figure 2:
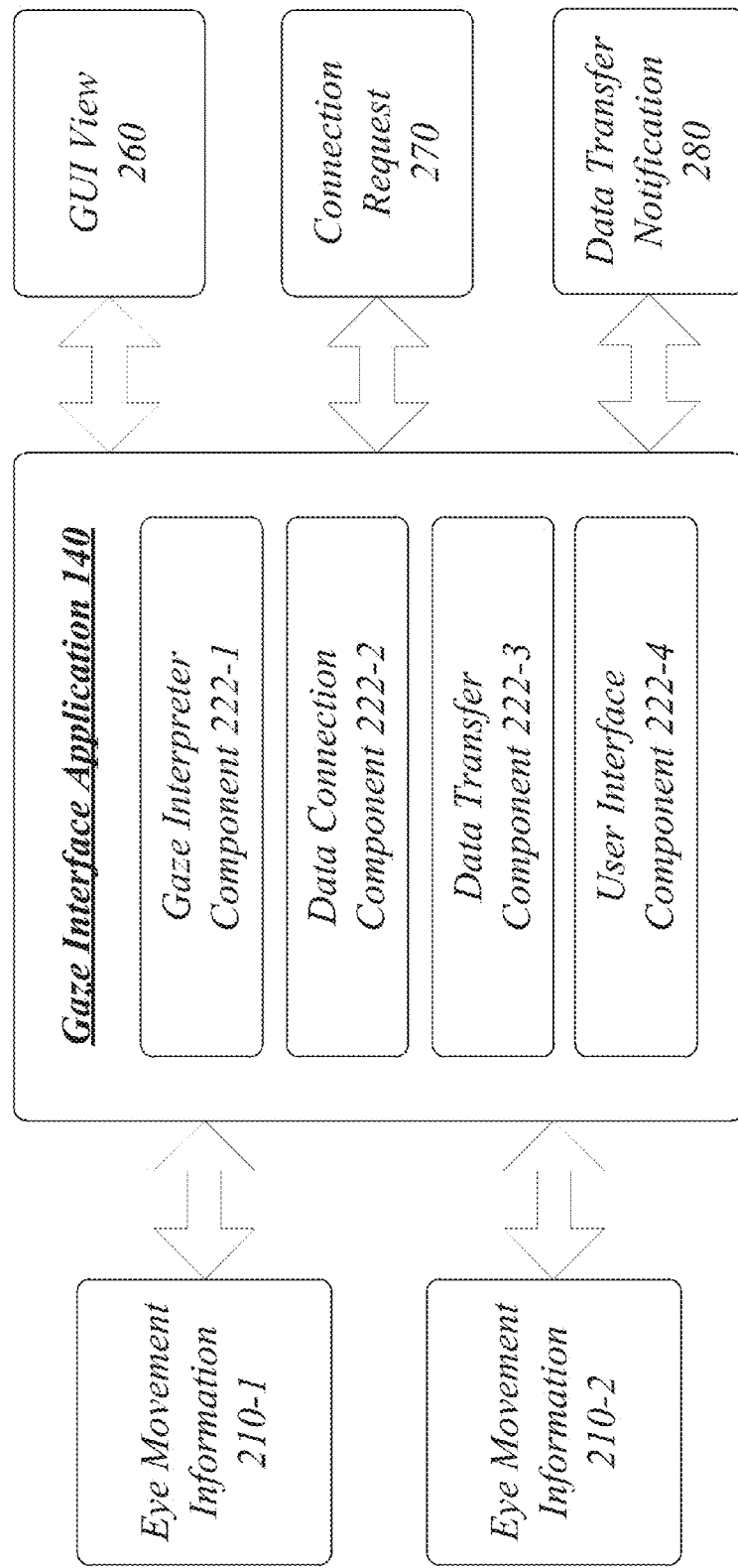
FIG. 2 illustrates an embodiment of a first operating environment for a gaze interface application.

FIG. 2 illustrates an embodiment of an operating environment 200 for the gaze content transfer system 100. More particularly, the operating environment 200 may illustrate a more detailed block diagram for the gaze interface application 140.

As shown in FIG. 2, the gaze interface application 140 may comprise various components 222-e. As used in this application, the term "component" is intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIG. 2, the gaze interface application 140 may comprise a gaze interpreter component 222-1, a data connection component 222-2, a data transfer component 222-3, and a user interface component 222-4. Although the gaze interface application 140 shown in FIG. 2 has only four components in a certain topology, it may be appreciated that the gaze interface application 100 may include more or less components in alternate topologies as desired for a given implementation. The embodiments are not limited in this context.

The gaze interpreter component 222-1 may generally analyze eye movement information 210-e to determine whether the eye movement information 210-e indicates a data unit transfer request. For instance, the gaze interpreter component 222-1 may analyze eye movement information 210-e for one or more defined eye movement patterns performed by a user that corresponds to a data unit transfer request. The user may learn the defined eye movement patterns through a series of graphical user interface (GUI) views, images or videos presented on the display 170 during a training phase of a user and the gaze interface application 140 and/or the eye gaze tracker 160.

In one embodiment, for example, the gaze interpreter component 222-1 may receive eye movement information 210-e representing stationary information, direction information, and distance information of one or more human eyes from one or more eye gaze trackers 160. The gaze interpreter component 222-1 may interpret the eye movement information 210-e as a data unit transfer request to transfer a data unit 142-b from a source device to a target device, such as the electronic device 120-1 to the electronic device 120-2, or vice-versa.

The data connection component 222-2 may generally manage a data connection 192 between source and target devices (e.g., electronic devices 120-1, 120-2). The data connection component 222-2 of may coordinate operations of the source and target devices to setup and teardown the data connection 192 as needed. For instance, when the electronic device 120-1 is a source device, it can send a connection request 270 to the electronic device 120-2 as a target device. When the electronic device 120-1 is a target device, it can receive a connection request 270 from the electronic device 120-2 as a source device. The data connection component 222-2 may then establish a data connection 192 using any number of known communications techniques as previously described for the transceivers 180-c with reference to FIG. 1.

In one embodiment, for example, the data connection component 222-2 may establish a data connection 192 between the source and target devices (e.g., electronic devices 120-1, 120-2) using transceivers 180-c in response to a data unit transfer request generated by the gaze interpreter component 222-1. The data connection 192 may be established as a peer-to-peer or ad-hoc network connection directly between the electronic devices 120-1, 120-2, or alternatively, indirectly through an external network such as the network 190. Since a data unit transfer request is generated based on eye movement information 210-e, the source and target devices are typically within a field of vision of a pair of human eyes, thereby limiting a communication range needed for the transceivers 180-c to short-range communications techniques as previously described. Further, in many cases, a user may keep the electronic devices 120-1, 120-2 within close proximity to each other, such as on a desk, thereby shortening the communications range even more. As such, the data connection component 222-2 may often utilize the wireless transceiver 180-1 as a short-range interface implementing suitable communication parameters for shorter range communications of information, rather than the wireless transceiver 180-2 which is a long-range interface implementing suitable communication parameters for longer range communications of information. This may conserve power and potentially data unit transfer times.

The data connection component 222-2 may select one of the wireless transceivers 180-1, 180-2 for any variety of reasons, such as greater bandwidth, higher signal strength, lower costs, and so forth. For instance, the data connection component 222-2 may receive different signal strength identifiers from the transceivers 180-1, 180-2, and select the transceiver 180-2 when it has a higher signal strength relative to the transceiver 180-1. Examples of signal strength identifiers may include without limitation a received signal strength indicator (RSSI), received channel power indicator (RCPI), signal-to-noise ratio (SNR) indicator, signal-to-noise plus interference ratio (SNIR) indicator, carrier-to-noise ratio (CNR) indicator, carrier-to-receiver noise density (C/kT) indicator, energy per bit to noise density (Eb/NO) indicator, energy per symbol to noise density (Es/NO) indicator, modulation error rate (MER) indicator, signal noise and distortion (SINAD) indicator, signal-to-interference ratio (SIR) indicator, signal-to-quantization-noise ratio (SQNR) indicator, and so forth. The embodiments are not limited in this context.

The data transfer component 222-3 may generally manage data unit transfer operations for the gaze interface application 140. For instance, when the electronic device 120-1 is a source device, it can send a data transfer notification 280 to the electronic device 120-2 as a target device over a data connection 192. The data transfer notification 280 may indicate to the electronic device 120-2 to prepare to receive a data unit 142-b. When the electronic device 120-1 is a target device, it can receive a data transfer notification 280 from the electronic device 120-2 as a source device over a data connection 192. The data transfer notification 280 may indicate to the 120-1 to prepare to receive a data unit 142-b. The data transfer component 222-3 may then begin transferring a data unit 142-b over a data connection 192 from a source device to a target device.

In one embodiment, for example, the data transfer component 222-3 may send a data unit 142-b from a source device to a target device (e.g., the electronic devices 120-1, 120-2) over a data connection 192. The data transfer component 222-3 may utilize any number of file transfer techniques and protocols to transfer data units 142-b between a source and target device (e.g., the electronic devices 120-1, 120-2). Some examples of file transfer techniques may include without limitation file transfer techniques primarily used with communications protocols Transmission Control Protocol (TCP) and Internet Protocol (IP) (collectively TCP/IP), such as the Plan 9 Filesystem Protocol (9P), Apple® Filing Protocol (AFP), BitTorrent®, Data unit transfer Access and Management (FTAM), Data unit transfer Protocol (FTP), FTP over Secure Socket Layer (FTPS), FTP via Hypertext Transfer Protocol (HFTP), Hypertext Transfer Protocol (HTTP), HTTP with SSL (HTTPS), Web-Based Distributed Authoring and Versioning (WebDAV), Unix Remote Copy (RCP), Secure Copy (SCP), Secret Data unit transfer Protocol (SFTP), Simple Data unit transfer Protocol (SFTP), and so forth. Some examples of file transfer techniques may include without limitation file transfer techniques primarily used with a communications protocol User Datagram Protocol (UDP), such as the Fast and Secure Protocol (FASP), File Service Protocol (FSP), Multicast Data unit transfer Protocol (MFTP), Trivial Data unit transfer Protocol (TFTP), Tsunami UDP Protocol (TUP), UDP-Based Data Transfer Protocol (UDT), UDP Based FTP with Multicast (UFTP), and so forth. Some examples of file transfer techniques may include without limitation file transfer techniques primarily used with direct modem connections, such as Kermit and variants, BiModem, Cmodem, Jmodem, Nmodem, Smodem, Tmodem, Unix-to-Unix Copy (UUCP), Xmodem, Ymodem, Zmodem, and so forth. Other file transfer techniques can be used, and the embodiments are not limited in this context.

The user interface component 222-4 may generate a graphic user interface (GUI) view comprising one or more GUI elements representing the one or more data units 142-b stored in the memory unit 150. The GUI view may be presented to a user via the display 170. The user interface component 222-4 may also generate GUI views with training materials designed to train a user to use certain defined eye movement patterns that represent a data unit transfer request. In one embodiment, for example, the user interface component 222-4 may present a video on the display 170 illustrating a user focusing her eyes on a GUI element representing a data unit 142-b for some defined time interval (e.g., 2 seconds), moving her eyes in a linear direction off the electronic device 120-1 (source device) and towards the electronic device 120-2 (target device), and focusing her eyes on the electronic device 120-2 or a GUI view of the electronic device 120-2 for some defined time interval (e.g., 2 seconds). This eye movement pattern may correspond to an eye gaze segment as described with reference to FIGS. 3-5. Other defined eye movement patterns may be used as well, such as an eye movement pattern that involves rotation of the eyes in a known pattern, shifting the eyes in a known pattern, blinking eyelids of an eye in a known pattern, looking at one device and then another device within a defined time period or a defined number of times, and so forth. Any defined eye movement pattern may be used as long as it is known by the user, known by the gaze interpreter component 222-1, and detectable by the eye gaze tracker 160. The embodiments are not limited in this context.

The user interface component 222-4 may also be used to resolve ambiguity that cannot be resolved by the gaze interface application 140 without some form of user intervention, such as whether a user intended to initiate a data unit transfer request. In such cases, the user interface component 222-4 may generate and surface user interface views with dialog boxes populated with information from the gaze content transfer system 100 and soliciting input from a user, such as a dialog box asking a user to "Please confirm transfer of the image file XYZ." However, even if there is no ambiguity, it still may be desirable to have the user interface component 222-4 to generate a surface user interface face views populated with information from the gaze content transfer system 100, or organized based on information from the gaze content transfer system 100. This could create a "mixed-initiative" interface. A mixed-initiative interface makes an inference and then makes it very easy for a user to explicitly act upon it, such as popping up a dialog box, pre-populating user interface fields with source information or target information, reordering items in a menu, and so forth. In such cases, rather than having the gaze interface application 140 interpret eye movement information 210-e as only explicit or implicit data unit transfer requests, the gaze interface application 140 may interpret eye movement information 210-e in a manner that prepares a data unit transfer request that may be easily invoked by a user through a user interface view.

Although the user interface component 222-4 is shown as part of the gaze interface application 140, the user interface component 222-4 may also be implemented as part of a system program for the electronic devices 120-1, 120-2, such as an operating system (OS).

Figure 3:
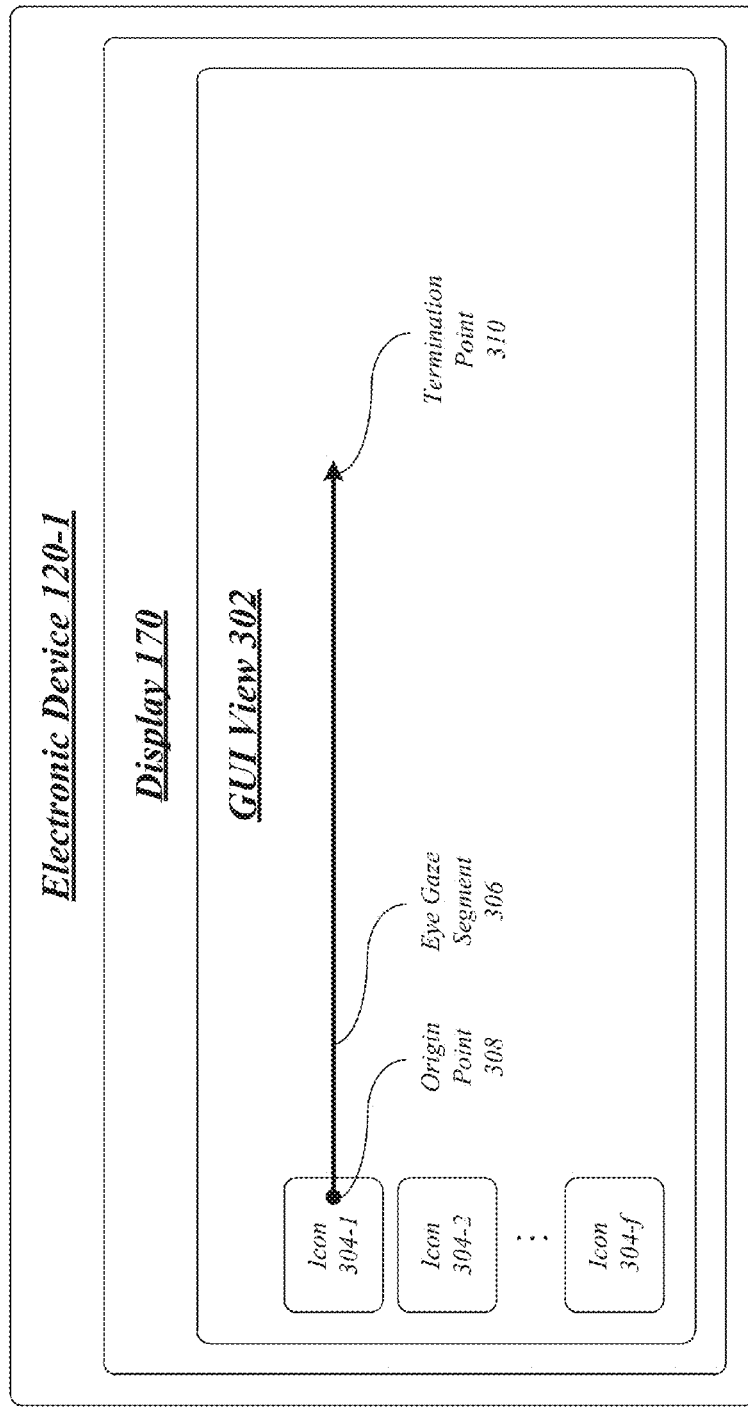
FIG. 3 illustrates an embodiment of a second operating environment for a gaze interface application.

FIG. 3 illustrates an embodiment of an operating environment 300 for the gaze content transfer system 100. More particularly, the operating environment 300 may illustrate a GUI view 302 presented on the display 170 of a source device, which in this case is the electronic device 120-1.

In the illustrated embodiment shown in FIG. 3, the GUI view 302 may comprise a number of GUI elements, such as one or more icons 304-*f*. In one embodiment, an icon 304-*f* may correspond to a single data unit 142-*b* stored in the memory unit 150 of the electronic device 120-1. For instance, an icon 304-1 corresponds to a data unit 142-1, an icon 304-2 corresponds to a data unit 142-2, and so forth. In one embodiment, an icon 304-*f* may correspond to multiple data units 142-*b* stored in the memory unit 150 of the electronic device 120-1. For instance, the icon 304-1 may correspond to multiple data units 142-1, 142-2.

As previously described with reference to FIG. 2, the gaze interpreter component 222-1 may receive eye movement information 210-*e* representing stationary information, direction information, and distance information of one or more human eyes from one or more eye gaze trackers 160. The gaze interpreter component 222-1 may interpret the eye movement information 210-*e* as a data unit transfer request to transfer a data unit 142-*b* from a source device to a target device, such as the electronic device 120-1 to the electronic device 120-2, or vice-versa. More particularly, the gaze interpreter component 222-1 of the gaze interface application 140 for one of the electronic devices 120-1, 120-2 may aggregate eye movement information 210-*e*, and extract an eye gaze segment 306 from the eye movement information 210-*e*. The gaze interpreter component 222-1 may then analyze the eye gaze segment 306 to infer whether the eye gaze segment 306 implies a data unit transfer request for a data unit 142-*b*, such as a data unit 142-1 stored in the memory unit 150, between the electronic devices 120-1, 120-2.

The gaze interface component 222-1 may determine whether an eye gaze segment 306 triggers a data unit transfer request by matching the eye gaze segment 306 with one of several defined eye movement patterns stored in the memory unit 150. For instance, the gaze interpreter component may use stationary information from the eye movement information 210-*e* to identify an origin point 308 for an eye gaze segment 306 relative to the GUI view 302. The gaze interface component 222-1 may map the origin point 308 to a GUI element in the GUI view 302 presented on the display 170 for the source device, which in this example is the electronic device 120-1. As shown in FIG. 3, the GUI element mapped to the origin point 308 may comprise the icon 304-1 representing a data unit 142-1 stored in the memory unit 150.

The gaze interface component 222-1 may map the origin point 308 to the icon 304-1 using any mapping techniques suitable for gaze-based interactive user interfaces. In one embodiment, for example, the eye movement information 210-*e* may include several Euclidian measurements, such as a three-dimensional (3D) gaze direction vector between an eye and the display 170. The gaze interface component 222-1 may use the 3D gaze direction vector to estimate a position on the screen where the 3D gaze direction vector will likely terminate on the display 170, capture screen coordinates (x, y) at the terminating position on the display screen, and compare the captured screen coordinates with the known screen coordinates (x, y) of the icon 304-1 as maintained by the user interface component 222-4 or the operating system of the electronic device 120-1. When the captured screen coordinates of the terminating position match the known screen coordinates of the icon 304-1, the gaze interface component 222-1 indicates a positive mapping. The granularity of the matching coordinates may vary according to a given implementation. Other known mapping techniques may be used as well, and the embodiments are not limited in this context.

Once the origin point 308 is mapped to the icon 304-1, the gaze interface component 222-1 may attempt to identify a termination point 310 for the eye gaze segment 306 based on direction information and distance information retrieved from the eye movement information 210-*e*. The gaze interpreter component 222-1 then attempts to map the termination point 310 to the target device, which in this case is the electronic device 120-2. The gaze interpreter component 222-1 may map the termination point 310 to the electronic device 120-2 using a number of different techniques, such as those used for the origin point 308, for example.

FIG. 3 illustrates a first case where the gaze interpreter component 222-1 indirectly maps the termination point 310 to the electronic device 120-2. In the example shown in FIG. 3, the termination point 310 remains within boundaries of the GUI view 302. This reflects a case where the user only gazes at the electronic device 120-1 and not the electronic device 120-2. Since the termination point 310 is within the GUI view 302, thereby not explicitly identifying the electronic device 120-2 as the target device, the gaze interpreter component 222-1 needs to perform some further analysis and make some additional inferences to confirm that the eye gaze segment 306 is: (1) a data unit transfer request; and (2) the target device is the electronic device 120-2. Confirmation of items (1) and (2) are needed in this case since the user did not actually gaze at the electronic device 120-2, or the gaze interpreter component 222-1 does not have sufficient eye movement information 210-*e* (e.g., from eye movement information 210-2 from the electronic device 120-2) to determine whether the user gazed at the electronic device 120-2, which would have otherwise confirmed items (1) and (2).

To determine whether the eye gaze segment 306 is a data unit transfer request, the gaze interpreter component 222-1 may examine a direction and distance for the eye gaze segment 306. When the direction indicates a relatively straight-line direction that if continued beyond the termination point 310 would eventually leave the boundaries of the GUI view 302, the display 170, or the electronic device 120-1, this may be a positive factor towards indicating the user desires to initiate a data unit transfer request. In another example, speed of eye movement may be another positive indicator of a data unit transfer request. In another example, when the distance is beyond a defined threshold distance, this may also be a positive factor mitigating towards a data unit transfer request. The defined threshold distance may vary according to a device size or display size. For instance, the defined threshold distance for a smart phone with a horizontal display size of 4 inches might be 2 inches, for a tablet computer with a horizontal display size of 10 inches might be 4 inches, and for a desktop computer with a horizontal display size of 20 inches might be 6 inches. When the direction and distance of the eye gaze segment 306 is positive, the gaze interpreter component 222-1 may determine that the eye gaze segment 306 represents user intent for a data unit transfer request.

Assuming the eye gaze segment 306 is confirmed as a data unit transfer request, the gaze interpreter component 222-1 may determine the target device by issuing a control directive to the data connection component 222-2 to initiate device discovery operations to determine nearby devices. When only a single device is discovered, such as the electronic device 120-2, the electronic device 120-2 is assumed to be the target device. When multiple devices are discovered, the data connection component 222-2 may issue a control directive to the user interface component 222-4 to generate a GUI element with a message to the user requesting selection of a particular device as the target device. Alternatively, the data connection component 222-2 may automatically select the target device based on historical information. For instance, if the last N data unit transfer request were to the electronic device 120-2, then the electronic device 120-2 may be selected as the target device.

Figure 4:
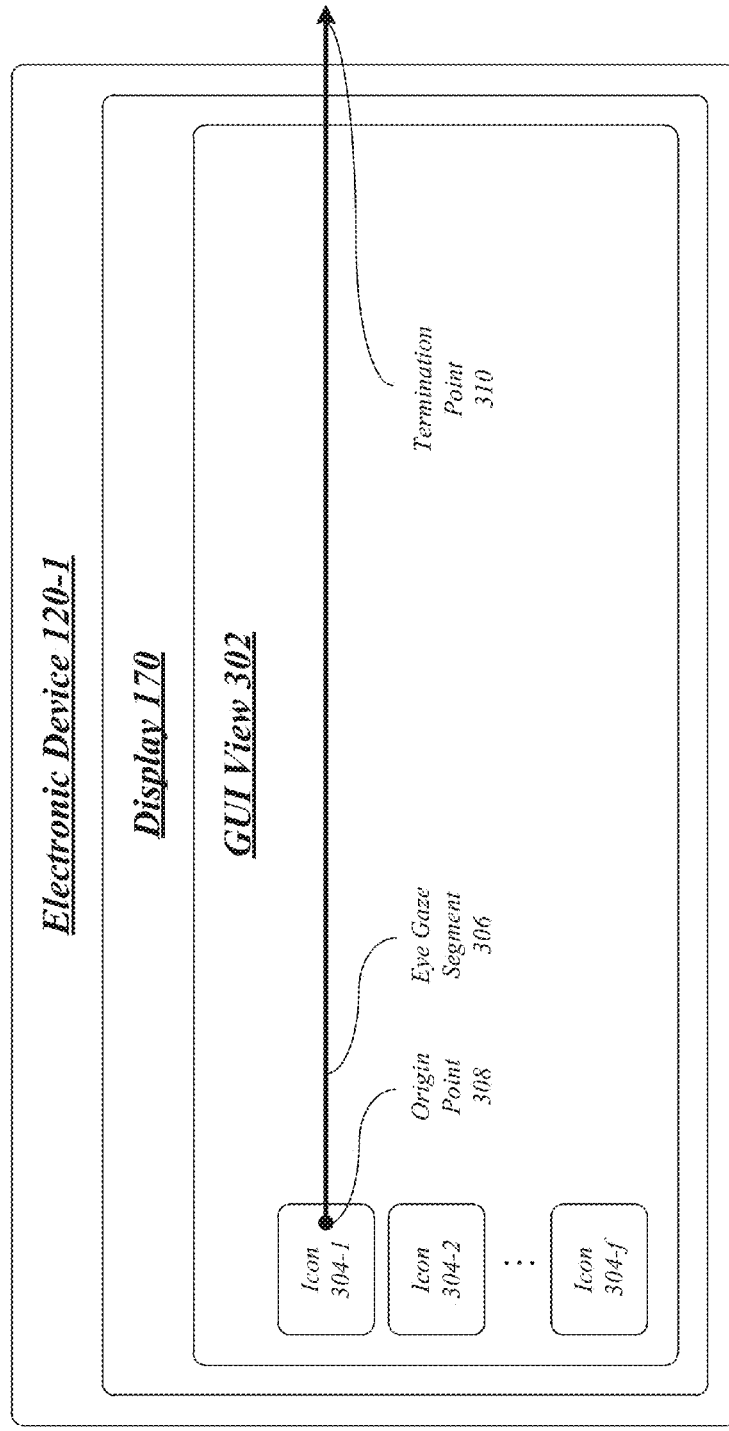
FIG. 4 illustrates an embodiment of a third operating environment for a gaze interface application.

FIG. 4 illustrates an embodiment of an operating environment 400 for the gaze content transfer system 100. More particularly, the operating environment 400 may illustrate a GUI view 302 presented on the display 170 of a source device, which in this case is the electronic device 120-1.

FIG. 4 illustrates a second case where the gaze interpreter component 222-1 indirectly maps the termination point 310 to the electronic device 120-2. In the example shown in FIG. 4, the termination point 310 is a point outside of the boundaries for the GUI view 302. Again, this reflects a case where the user only gazes at the electronic device 120-1 and not the electronic device 120-2. However, unlike the operating environment 300 where the termination point 310 is within the boundaries of the GUI view 302, the operating environment 400 illustrates a case where the termination point 310 of the eye gaze segment 306 is outside of the GUI view 302. This is a stronger positive indicator that the eye gaze segment 306 is a data unit transfer request by a user.

Although the termination point 310 is outside of the GUI view 302, however, it still does not explicitly identify the electronic device 120-2 as the target device. As such, the gaze interpreter component 222-1 still needs to perform some further analysis and make some additional inferences to confirm the eye gaze segment 306 as a data unit transfer request. The gaze interpreter component 222-1 may examine a direction and distance for the eye gaze segment 306 as previously described with reference to FIG. 3 for this confirmation.

In those cases where the gaze interpreter component 222-1 needs to indirectly map the termination point 310 to the target device, and the gaze interpreter component 222-1 determines that the eye gaze segment 306 is a data unit transfer request, the gaze interpreter component 222-1 may issue a control directive to the data connection component 222-2 to initiate device discovery operations to determine nearby devices, and select a discovered device as the target device as previously described with reference to FIG. 3.

Figure 5:
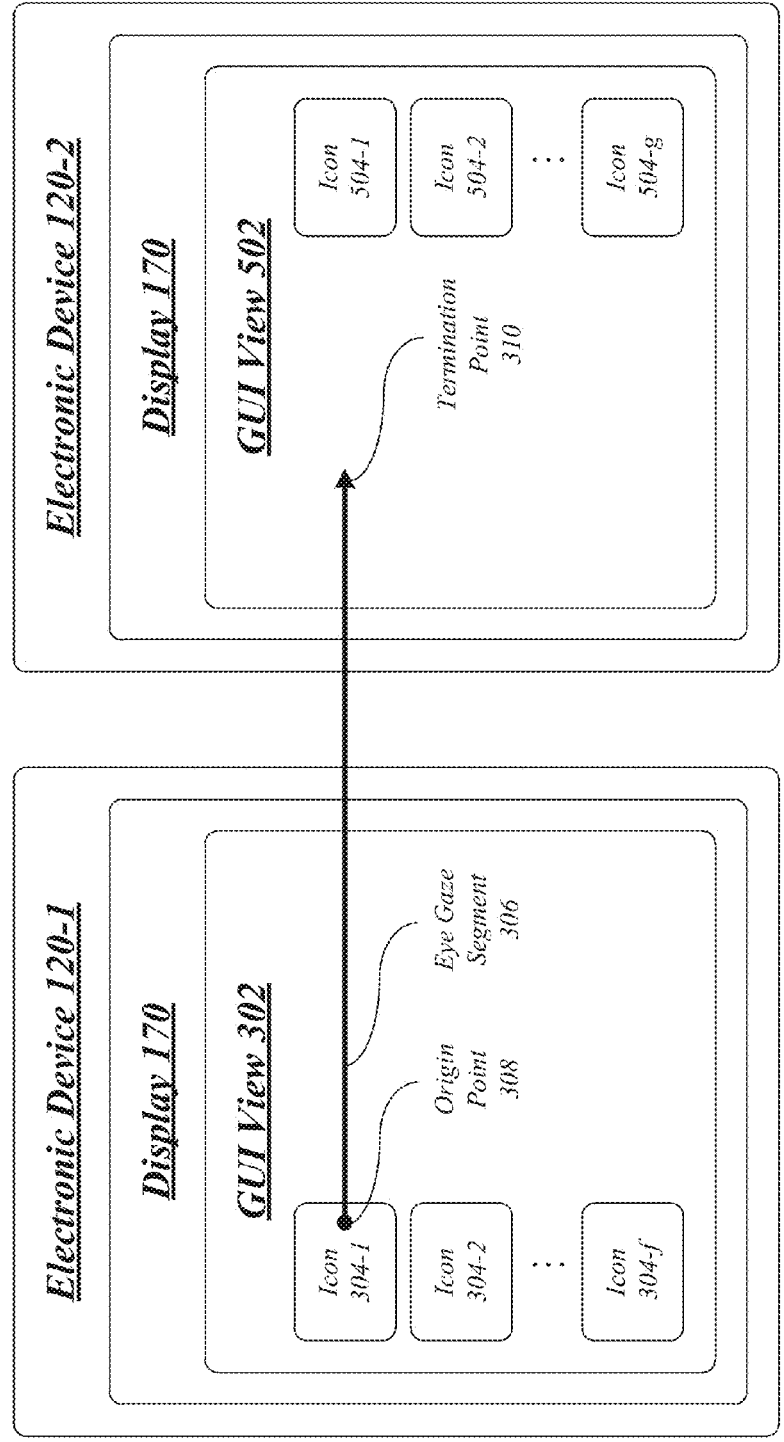
FIG. 5 illustrates an embodiment of a fourth operating environment for a gaze interface application.

FIG. 5 illustrates an embodiment of an operating environment 500 for the gaze content transfer system 100. More particularly, the operating environment 500 may illustrate a GUI view 302 presented on the display 170 of a source device, which in this case is the electronic device 120-1, and a GUI view 502 presented on the display 170 of a target device, which in this case is the electronic device 120-2.

In the illustrated embodiment shown in FIG. 5, the GUI view 502 may comprise a number of GUI elements, such as one or more icons 504-g. In one embodiment, an icon 504-g may correspond to a single data unit 142-b stored in the memory unit 150 of the electronic device 120-2. For instance, an icon 504-1 corresponds to a data unit 142-1, an icon 504-2 corresponds to a data unit 142-2, and so forth. In one embodiment, an icon 504-g may correspond to multiple data units 142-b stored in the memory unit 150 of the electronic device 120-2. For instance, the icon 504-1 corresponds to multiple data units 142-1, 142-2.

FIG. 5 illustrates a case where the gaze interpreter component 222-1 directly maps the termination point 310 of the eye gaze segment 306 to the electronic device 120-2. In the example shown in FIG. 5, the termination point 310 is a point outside of the boundaries for the GUI view 302 and within the boundaries of the GUI view 502. This reflects a case where the user gazes at both of the electronic devices 120-1, 120-2. Unlike the operating environments 300, 400 where the termination point 310 does not directly map to the electronic device 120-2, the operating environment 500 illustrates a case where the termination point 310 of the eye gaze segment 306 is directly on the electronic device 120-2, namely the GUI view 502 presented on the display 170 of the electronic device 120-2. This serves as a stronger positive indicator that the eye gaze segment 306 is a data unit transfer request by a user, and that the target device is the electronic device 120-2. As such, the additional analysis needed for the indirect mapping cases shown in operating environments 300, 400 may not be needed for the direct mapping case shown in operating environment 500.

In various embodiments, the gaze interpreter component 222-1 may receive eye movement information 210-e from one of the eye gaze trackers 160 of the electronic devices 120-1, 120-2. Alternatively, the gaze interpreter component 222-1 may receive eye movement information 210-e from both eye gaze trackers 160 of the electronic devices 120-1, 120-2.

In one embodiment, for example, the gaze interpreter component 222-1 of the electronic device 120-1 may receive a complete set of eye movement information 210-1 from the eye gaze tracker 160 of the source device, which in this case is the electronic device 120-1. In this case, the gaze interpreter component 222-1 may retrieve an eye gaze segment 306 with an origin point 308 and a termination point 310 from the eye movement information 210-1. Since the gaze interpreter component 222-1 knows the coordinates for the GUI view 302, it may map the origin point 308 to the GUI view 302 using the known coordinates. However, the gaze interpreter component 222-1 may not necessarily know the 3D coordinates of the electronic device 120-2, or if known, the electronic device 120-2 may have moved. As such, mapping the termination point 310 to the electronic device 120-2 may be a more complex operation.

To map the termination point 310 to the electronic device 120-2, any of the previously described indirect mapping techniques may be used. In addition, the gaze interpreter component 222-1 may intercept or receive digital images captured by a video camera of the eye gaze tracker 160, perform image analysis to detect objects in the digital images, and match a detected object with the electronic device 120-2. The gaze interpreter component 222-1 may then generate 3D coordinates for the electronic device 120-2, and attempt to match the 3D coordinates of the electronic device 120-2 with a termination of the 3D gaze direction vector provided by the eye movement information 210-e. Matching coordinates may indicate a positive match between the termination point 310 and the electronic device 120-2.

Alternatively, the gaze interpreter component 222-1 of the electronic device 120-2 may send mapping information indicating a mapping between the termination point 310 and the GUI view 502 to the gaze interpreter component 222-1 of the electronic device 120-1. The gaze interpreter component 222-1 of the electronic device 120-1 may use the mapping information received from the electronic device 120-2 as a positive match between the termination point 310 and the electronic device 120-2.

In one embodiment, for example, the gaze interpreter component 222-1 may receive a complete set of eye movement information 210-2 from the eye gaze tracker 160 of the target device, which in this case is the electronic device 120-2. In this case, the gaze interpreter component 222-1 may retrieve an eye gaze segment 306 with an origin point 308 and a termination point 310 from the eye movement information 210-2. Further, the gaze interpreter component 222-1 of the electronic device 120-2 may augment the eye movement information 210-2 to include mapping information between the termination point 310 and the GUI view 502. Alternatively, the mapping information may be sent from the electronic device 120-2 as a separate set of information from the eye movement information 210-2. In either case, the gaze interpreter component 222-1 may be able to directly map an origin point 308 to the electronic device 120-1 using known coordinates for the GUI view 302, and a termination point 310 to the electronic device 120-2 using the mapping information from the eye movement information 210-2.

In one embodiment, for example, the gaze interpreter component 222-1 may receive a complete set of eye movement information 210-3 from both eye gaze trackers 160 of the source device and the target device, respectively, with the eye movement information 210-3 comprising a first portion of eye movement information 210-1 from an eye gaze tracker 160 of the electronic device 120-1, and a second portion of the eye movement information 210-2 from an eye gaze tracker 160 of the electronic device 120-2. The second portion of the eye movement information 210-2 may include mapping information for the termination point 310 as previously described, or the mapping information may be sent as a separate set of information. In this case, the gaze interpreter component 222-1 may retrieve an eye gaze segment 306 with an origin point 308 and a termination point 310 from the combined set of eye movement information 210-3. As such, the gaze interpreter component 222-1 may be able to directly map an origin point 308 to the electronic device 120-1, and a termination point 310 to the electronic device 120-2, as it has eye movement information 210-1, 210-2 from the electronic devices 120-1, 120-2, respectively.

It is worth to note that although FIGS. 3-5 describe a trigger for a data unit transfer request as a defined eye movement pattern of an eye gaze segment 306, which utilizes stationary information, direction information and distance information from the eye movement information 210-e, it may be appreciated that other triggers for a data unit transfer request may include partial amounts of the information provided by eye movement information 210-e as well. In one embodiment, for example, only stationary information can be used to identify a defined eye movement pattern combined with temporal information. For example, the gaze interpreter component 222-1 could monitor for a simple eye movement pattern where the user looks at the electronic device 120-1, and within some defined time interval, looks at the electronic device 120-1. This may be sufficient to trigger a data unit transfer request. The gaze interpreter component 222-1 could also monitor for repeating eye movement patterns, such as repeatedly looking between the electronic devices 120-1, 120-2 for some number of iterations. These type of defined eye movement patterns would be particularly useful in those situations where a temporal sampling rate was really low, a spatial sampling rate was very poor, or there was an occlusion such that the directional information was lost. The embodiments are not limited to these examples.

Figure 6A:
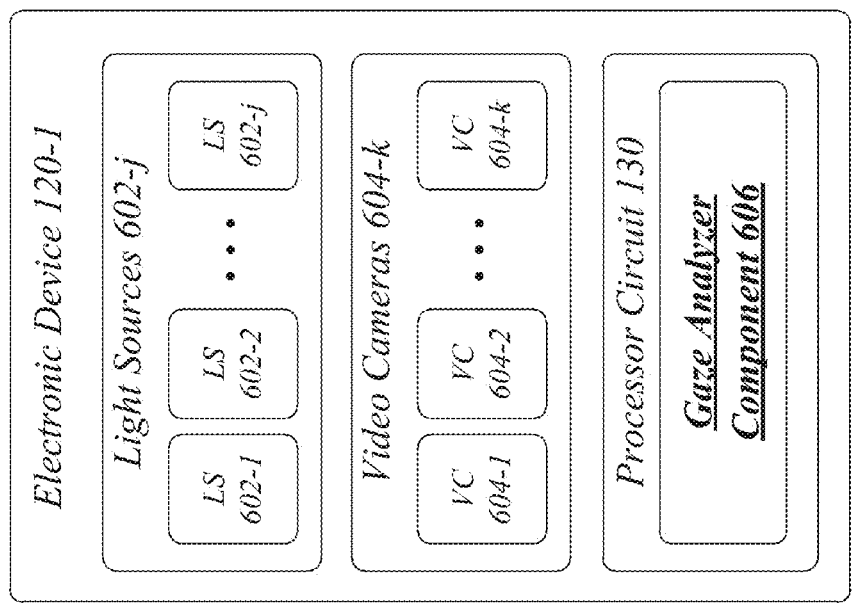
FIGS. 6A, 6B illustrate an embodiment an eye gaze tracker for a gaze interface system.

FIG. 6A illustrates a more detailed diagram of an exemplary eye gaze tracker 160 suitable for the electronic devices 120-1, 120-2. The eye gaze tracker 160 is designed to detect movement of one or more eyes of a human user. As shown in FIG. 6A, the eye gaze tracker 160 may comprise, for example, one or more light sources 602-$j$, one or more video cameras 604-$k$, and a gaze analyzer component 606. Although the eye gaze tracker 160 shown in FIG. 6A has a limited number of elements in a certain topology, it may be appreciated that the eye gaze tracker 160 may include more or less elements in alternate topologies as desired for a given implementation.

The light sources 602-$j$ are arranged to generate light beams towards one or both eyes of a human user of the electronic device 120-1. The light sources 602-$j$ may project electromagnetic radiation of a defined wavelength. In one embodiment, the light sources 602-$j$ may project electromagnetic radiation at a wavelength that is not visible to a user, such as near infra-red light, for example. The light sources 602-$j$ are positioned to shine on a face of a user, typically along a same axis as an optical axis of the video cameras 604-$k$. An example of a light source 602-$j$ may comprise a semiconductor light source, such as a light-emitting diode (LED), organic LED (OLED), and other semiconductor devices.

The video cameras 604-$k$ are arranged to record digital images of the eyes. The digital images include one or more virtual images of the one or more light sources 602-$j$ and an illuminated pupil for each eye caused by the reflection of the light beams from a cornea of each eye.

The gaze analyzer component 606 may execute on the processor circuit 130, or a separate processor, and perform image analysis on the digital images captured by the video cameras 604-$k$. The gaze analyzer component 606 may analyze the digital images to determine direction and distance of movement of the eyes based on the virtual images and the illuminated pupils. The gaze analyzer component 606 may output stationary information, direction information and distance information as eye movement information 210-$e$ to the gaze interface application 140.

Figure 6B:
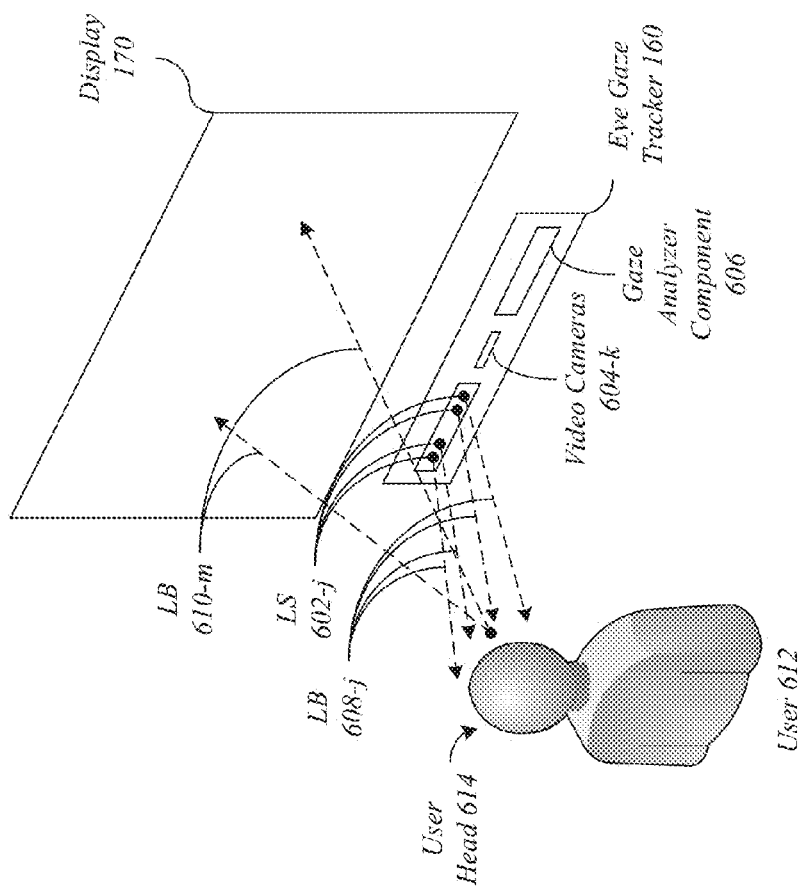

FIG. 6B illustrates a more detailed diagram of the exemplary eye gaze tracker 160 described in FIG. 6A. The eye gaze tracker 160 shown in FIG. 6B has been slightly exaggerated to illustrate operations of the eye gaze tracker 160. It may be appreciated that micro-electronics may be used to make an eye gaze tracker 160 suitable for different form factors of the electronic devices 120-1, 120-2, such as a form factor for a desktop computer, notebook computer, tablet computer, smart phone, digital frame, or consumer appliance. The embodiments are not limited in this context.

In general operation, the eye gaze tracker 160 may track eye movements of a user 612 using a corneal reflection technique. The light sources 602-$j$ project corresponding light beams 608-$j$ toward the eye of a user head 614 of the user 612, and monitor the angular difference between pupil position and a reflection of the light beams 608-$j$ from the cornea surface. The light beams 608-$j$ may comprise near-infrared light since the user 612 cannot see this wavelength and therefore avoid distractions. The light reflected from the eye has two major components. The first component is a "glint," which is a very small and very bright virtual image of the light source 602-$j$ reflected from a front surface of the corneal bulge of the eye. The second component is light that has entered the eye and has been reflected back out from the retina. This light serves to illuminate the pupil of the eye from behind, causing the pupil to appear as a bright disk against a darker background. This retro-reflection, or "bright eye" effect familiar to flash photographers, provides a very high contrast image. The eye gaze tracker 160 determines a center of the pupil and one or more glints, and the change in the distance and direction between these points as the eye is rotated. The orientation of the eyeball can be inferred from the differential motion of the pupil center relative to the one or more glints. The gaze analyzer component may use this information to generate various 3D gaze direction vectors 610-*m* between one or both eyes and the display 170. Other eye tracking techniques may be used other than corneal reflection, and the embodiments are not limited in this context.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein. For example, the logic flow 700 may illustrate operations performed by the gaze content transfer system 100.

In the illustrated embodiment shown in FIG. 7, the logic flow 700 may receive eye movement information of a human eye from one or more eye gaze trackers at block 702. For example, the gaze interpreter component 222-1 may receive eye movement information 210-*e* of a human eye from one or more eye gaze trackers 160 for electronic devices 120-1, 120-2, respectively.

The logic flow 700 may interpret the eye movement information as a data unit transfer request to transfer a file from a source device to a target device at block 704. For example, the gaze interpreter component 222-1 may interpret the eye movement information 210-*e* as a data unit transfer request to transfer a data unit 142-*b* from the electronic device 120-1 to the electronic device 120-2.

The logic flow 700 may establish a data connection between the source and target devices in response to the data unit transfer request at block 706. For example, the data connection component 222-2 may send a connection request 270 to the electronic device 120-2 to establish a data connection 192 between the electronic devices 120-1, 120-2.

The logic flow 700 may transfer the file from the source device to the target device over the data connection at block 708. For example, the data transfer component 222-3 may transfer the data unit 142-*b* from the electronic device 120-1 to the electronic device 120-2 over the data connection 192 using a suitable data unit transfer protocol.

The logic flow 700 may terminate the data connection between the source and target devices after the file is transferred at block 710. For example, the data connection component 222-2 may terminate the data connection 192 between the electronic devices 120-1, 120-2 once the data unit transfer is complete.

FIG. 8 illustrates one embodiment of a logic flow 800. The logic flow 800 may be representative of some or all of the operations executed by one or more embodiments described herein. For example, the logic flow 800 may illustrate operations performed by the gaze content transfer system 100. More particularly, the logic flow 800 may provide more detailed operations to interpret eye movement information 210-*e* at block 704 of the logic flow 700 as described with reference to FIG. 7.

In the illustrated embodiment shown in FIG. 8, the logic flow 800 may identify an origin point and a termination point for an eye gaze segment based on the eye movement information at block 802. For example, the gaze interpreter component 222-1 may identify an origin point 308 and a termination point 310 for an eye gaze segment 306 based on the eye movement information 210-*e*.

The logic flow 800 may map the origin point to a file stored by a source device at block 804. For example, the gaze interpreter component 222-1 may map the origin point 308 to a data unit 142-1 stored in the memory 150 of the electronic device 120-1 via the icon 304-1.

The logic flow 800 may map the termination point to a target device at block 806. For example, the gaze interpreter component 222-1 may directly or indirectly map the termination point 310 to the electronic device 120-2. The gaze interpreter component 222-1 may directly map the termination point 310 to the electronic device 120-2 when the termination point 310 coincides with the electronic device 120-2. The gaze interpreter component 222-1 may indirectly map the termination point 310 to the electronic device 120-2 when the termination point 310 does not coincide with the electronic device 120-2, but there are sufficient positive factors to infer that the electronic device 120-2 is the target device.

The logic flow 800 may interpret the eye gaze segment as a data unit transfer request to transfer the file from the source device to the target device at block 808. For example, the gaze interpreter component 222-1 may interpret the eye gaze segment 306 as a data unit transfer request to transfer the data unit 142-1 from the electronic device 120-1 to the electronic device 120-2 when the origin point 308 sufficiently maps to the electronic device 120-1 and the termination point 310 maps to the electronic device 120-2.

FIG. 9 illustrates one embodiment of a logic flow 900. The logic flow 900 may be representative of some or all of the operations executed by one or more embodiments described herein. For example, the logic flow 900 may illustrate operations performed by the eye gaze tracker 160.

In the illustrated embodiment shown in FIG. 9, the logic flow 900 may generate light beams towards eyes of the human user at block 902. For example, one or more of the light sources 602-*j* may each generate a light beam 608-*j* directed towards the user head 614 into one or both eyes of the human user 612.

The logic flow 900 may record images of the eyes, the images including a virtual image of the light source and an illuminated pupil caused by reflection of the light beams from a cornea of each eye at block 904. For example, one or more of the video cameras 604-*k* may record digital images of the eyes, the digital images including one or more virtual images corresponding to each of the light sources 602-*j* and an illuminated pupil caused by reflection of the light beams 608-*j* from a cornea of each eye The logic flow 900 may analyze direction and distance of movement of the eyes based on the virtual images and the illuminated pupils at block 906. For example, the gaze analyzer component 606 may analyze direction and distance of movement of the eyes based on the virtual images and the illuminated pupils.

The logic flow 900 may send the direction and distance of movement of the yes as eye movement information to a gaze interface application at block 908. For example, the gaze analyzer component 606 may send the direction and distance of movement of the eyes as eye movement information 210-*e* to the gaze interface application 140, for use in initiating data unit transfer operations to transfer a data unit 142-*b* between the electronic devices 120-1, 120-2.

Figure 10:
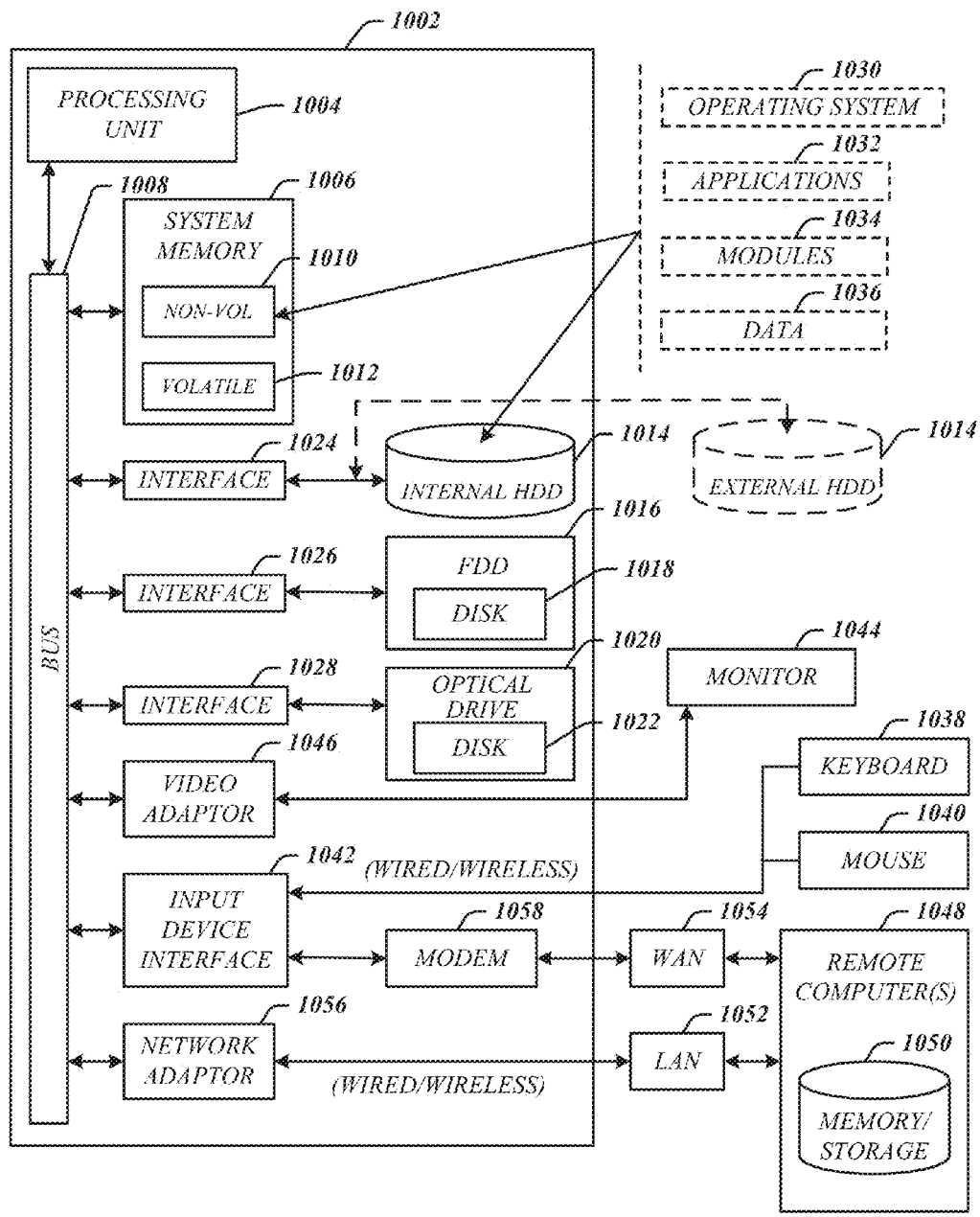
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device 120-*a*.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, such as those described with reference to the processor circuit 130 shown in FIG. 1.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the gaze content transfer system 100 as previously described with reference to FIGS. 1-10 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. At least one non-transitory computer-readable storage medium comprising instructions that, when executed, cause a system to:
   receive first portion of eye movement information of a human eye from an eye gaze tracker of a source device;
   receive a second portion of the eye movement information from an eye gaze tracker of a target device,
   determine aggregated eye movement information by aggregating the first portion of eye movement information and the second portion of the eye movement information;
   extract a plurality of eye gaze segments based on the aggregated eye movement information;
   identify an origin point and a termination point of the plurality of eye gaze segments based on the aggregated eye movement information;
   map the origin point to a data unit stored by the source device;
   map the termination point to the target device; and
   analyze the plurality of eye gaze segments to determine whether at least one of the plurality of eye gaze segments is the data unit transfer to transfer the data unit from the source device to the target device based on at least one factor, the at least one factor comprising the termination point being a point outside of a boundary of a graphical user interface (GUI) view of the source device.

2. The non-transitory computer-readable storage medium of claim 1, comprising instructions that when executed cause the system to map the origin point to a GUI element in a GUI view presented on a display for the source device, the GUI element representing the data unit stored in by the source device.

3. The non-transitory computer-readable storage medium of claim 1, comprising instructions that when executed cause the system to establish a data connection between the source and target devices in response to the data unit transfer request.

4. The non-transitory computer-readable storage medium of claim 1, comprising instructions that when executed cause the system to send the data unit from the source device to the target device over the data connection.

5. The non-transitory computer-readable storage medium of claim 1, the at least one factor comprising a speed of eye movement.

6. A method, comprising:
   receiving first portion of eye movement information of a human eye from one or more eye gaze trackers of a source device;
   receiving a second portion of the eye movement information from the eye gaze tracker of a target device;
   determining aggregated eye movement information by aggregating the first portion of eye movement information and the second portion of the eye movement information;
   extracting a plurality of eye gaze segments based on the aggregated eye movement information;
   identifying a origin point for the eye gaze segments based on the first portion of the eye movement information;
   identifying a termination point for the eye gaze segments based on the second portion of the eye movement information;
   analyzing the plurality of eye gaze segments to determine whether at least one of the plurality of eye gaze segments is the data unit transfer to transfer a data unit from the source device to a target device based on at least one factor, the at least one factor comprising the termination point being a point outside of a boundary of a graphical user interface (GUI) view of the source device;
   establishing a data connection between the source and target devices in response to the data unit transfer request; and
   transferring the data unit from the source device to the target device over the data connection.

7. The method of claim 6, comprising mapping an origin point to a GUI element in a GUI view presented on a display for the source device, the GUI element representing a data unit stored in a memory unit.

8. The method of claim 6, comprising identifying a termination point for the eye gaze segment based on the eye movement information.

9. The method of claim 6, comprising mapping the termination point to the target device.

10. The method of claim 6, the at least one factor comprising a speed of eye movement.

11. An apparatus, comprising:
    a transceiver;
    a processor circuit coupled to the transceiver; and
    a memory unit coupled to the processor circuit, the memory unit to store a gaze interface application and one or more data units, the gaze interface application operative on the processor circuit to manage data unit transfer operations based on eye movements of a human user, the gaze interface application comprising:
    a gaze interpreter component operative to:
      receive a first portion of the eye movement information from an eye gaze tracker of a source device, and a second portion of the eye movement information from an eye gaze tracker of a target device,
      determine aggregated eye movement information by aggregating the first portion of eye movement information and the second portion of the eye movement information,
      extract a plurality of eye gaze segments based on the aggregated eye movement information,
      identity an origin point for the eye segments based on the first portion of eye movement information;
      identity an termination point for the eye segments based on the second portion of eye movement information;
      analyze the plurality of eye gaze segments to determine whether at least one of the plurality of eye gaze segments is the data unit transfer to transfer a data unit from the source device to a target device based on at least one factor, the at least one factor comprising a termination point of the eye gaze segment being a point outside of a boundary of a graphical user interface (GUI) view of the source device;

a data connection component operative to establish a data connection between the source and target devices using the transceiver in response to the data unit transfer request; and a data transfer component operative to send the data unit from the source device to the target device over the data connection.

12. The apparatus of claim 11, comprising a display coupled to the processor circuit, the display to present a GUI view and one or more GUI elements representing the one or more data units stored in the memory unit.

13. The apparatus of claim 11, the gaze interpreter component operative to map an origin point to a GUI element in a GUI view presented on a display for the source device, the GUI element representing a data unit stored in the memory unit.

14. The apparatus of claim 11, the gaze interpreter component operative to map a termination point to the target device.

15. The apparatus of claim 11, the gaze interpreter component operative to receive the eye movement information from an eye gaze tracker of the target device.

16. The apparatus of claim 11, comprising an eye gaze tracker operative to detect eye movements of the human user, the eye gaze tracker comprising:

a light source operative to generate light beams towards eyes of the human user;

a video camera to record images of the eyes, the images including a virtual image of the light source and an illuminated pupil caused by reflection of the light beams from a cornea of each eye; and a gaze analyzer component coupled to the video camera, the gaze analyzer component operative to analyze direction and distance of movement of the eyes based on the virtual images and the illuminated pupils.

* * * * *